(12) United States Patent
Fujisawa

(10) Patent No.: US 12,384,082 B2
(45) Date of Patent: Aug. 12, 2025

(54) CORE MOLDING APPARATUS AND CORE MOLDING METHOD

(71) Applicant: TOYOTA JIDOSHA KABUSHIKI KAISHA, Toyota (JP)

(72) Inventor: Takehisa Fujisawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 17/822,442

(22) Filed: Aug. 26, 2022

(65) Prior Publication Data

US 2023/0112343 A1 Apr. 13, 2023

(30) Foreign Application Priority Data

Oct. 8, 2021 (JP) ................. 2021-165851

(51) Int. Cl.
*B29C 45/46* (2006.01)
*B29C 33/38* (2006.01)
(Continued)

(52) U.S. Cl.
CPC ........ *B29C 45/461* (2013.01); *B29C 33/3842* (2013.01); *B29C 45/53* (2013.01); *B29C 45/581* (2013.01); *B29C 45/76* (2013.01); *B29C 2945/76083* (2013.01); *B29C 2945/76107* (2013.01); *B29C 2945/76351* (2013.01);
(Continued)

(58) Field of Classification Search
CPC .............. B29C 45/461; B29C 33/3842; B29C 2945/76083; B29C 2945/76107; B29C 2945/76351; B29C 2945/76591; B29C 2945/76829; B29C 45/76; B29C 45/581; B29C 9/10; B29L 2031/757; B22C 13/16; B22C 7/06; B22C 5/0409
See application file for complete search history.

(56) References Cited

U.S. PATENT DOCUMENTS 4,983,336 A * 1/1991 Langlois ................. B29C 45/76
425/149
5,260,010 A * 11/1993 Yokota .................... B29C 45/76
264/40.5
(Continued)

FOREIGN PATENT DOCUMENTS

| JP | 2013-71163 A | 4/2013 |
|---|---|---|
| JP | 2014-184477 A | 10/2014 |
| JP | 2018-69301 A | 5/2018 |

*Primary Examiner* — Xiao S Zhao
*Assistant Examiner* — Inja Song
(74) *Attorney, Agent, or Firm* — Oblon, McClelland, Maier & Neustadt, L.L.P.

(57) ABSTRACT

A core molding apparatus and a core molding method capable of reducing the possibility of the deterioration in the calculation accuracy of the amount of supply of a raw material for a core are provided. A core molding apparatus includes: a kneading tank configured to knead a raw material for a core; a raw material supply unit configured to supply the raw material to the kneading tank; a mold configured to contain a kneaded material made of the raw material kneaded in the kneading tank and to mold the core; a piston configured to inject the kneaded material contained in the kneading tank into the mold; and a control unit configured to control an amount of supply of the raw material from the raw material supply unit to the kneading tank.

1 Claim, 5 Drawing Sheets

(51) Int. Cl.
*B29C 45/53* (2006.01)
*B29C 45/58* (2006.01)
*B29C 45/76* (2006.01)
*B29L 31/00* (2006.01)

(52) U.S. Cl.
CPC ............... *B29C 2945/76591* (2013.01); *B29C 2945/76829* (2013.01); *B29L 2031/757* (2013.01)

(56) References Cited

U.S. PATENT DOCUMENTS

| | | | |
|---|---|---|---|
| 5,296,174 A * | 3/1994 | Yakemoto | B29C 45/77 425/149 |
| 2015/0197044 A1* | 7/2015 | Kato | B22C 7/023 264/40.5 |
| 2016/0052047 A1 | 2/2016 | Uchida et al. | |
| 2019/0283119 A1* | 9/2019 | Okumura | B22C 5/0472 |

* cited by examiner

CORE MOLDING APPARATUS AND CORE MOLDING METHOD

CROSS REFERENCE TO RELATED APPLICATIONS

This application is based upon and claims the benefit of priority from Japanese patent application No. 2021-165851, filed on Oct. 8, 2021, the disclosure of which is incorporated herein in its entirety by reference.

BACKGROUND

The present disclosure relates to a core molding apparatus and a core molding method, and in particular to a core molding apparatus and a core molding method for molding a core for casting.

A core molding apparatus disclosed in Japanese Unexamined Patent Application Publication No. 2018-069301 includes a piston for injecting a kneaded material contained in a kneading tank into a mold. The core molding apparatus obtains a difference between a predetermined reference position of the injection piston and a position thereof after the injection. The core molding apparatus obtains an amount of supply of core sand by calculating the product of the obtained difference, the specific gravity (the density) of the sand, and the cross sectional area of the kneading tank. The reference position can be obtained, for example, by experiments.

SUMMARY

The inventors of the present disclosure have found the following problem.

The density of the core sand before an injection may differ from the density thereof after the injection. Further, the above-described product corresponds to the change between the volume of the kneaded material in the kneading tank before the injection and the volume thereof after the injection. In such a case, the position of the piston upon the completion of the injection may widely fluctuate (i.e., deviate) from the expected position. Therefore, there is a possibility that the accuracy of the calculation (hereinafter also referred to as the calculation accuracy) of the amount of supply of the raw material for the core deteriorates.

In view of the above-described problem, an object of the present disclosure is to provide a core molding apparatus and a core molding method capable of reducing the possibility of the deterioration in the calculation accuracy of the amount of supply of a raw material for a core.

A first exemplary aspect is a core molding apparatus including:

a kneading tank configured to knead a raw material for a core;

a raw material supply unit configured to supply the raw material to the kneading tank;

a mold configured to contain a kneaded material made of the raw material kneaded in the kneading tank, and to mold the core;

a piston configured to inject the kneaded material contained in the kneading tank into the mold; and a control unit configured to control an amount of supply of the raw material from the raw material supply unit to the kneading tank, wherein the control unit is further configured to:

calculate an amount of a change in a total volume of the kneaded material in the core molding apparatus upon completion of a predetermined injection by subtracting a kneading tank volume for the kneaded material remaining in the kneading tank after the predetermined injection from a total reference volume of the kneaded material in the core molding apparatus after the predetermined injection; and determine an amount of supply of the raw material by multiplying the amount of the change in the total volume by a density of the molded core.

According to the above-described configuration, the amount of supply of a raw material is obtained by using the density of a molded core after an injection and the change in the volume of a kneaded material in the whole core molding apparatus after the injection. Therefore, the change in the density of the core after the injection from the density thereof before the injection does not affect the calculation accuracy of the amount of supply of the material for the core. Therefore, it is possible to reduce the possibility of the deterioration in the calculation accuracy of the amount of supply of a raw material for a core.

Further, the core molding apparatus may further include an injection plate disposed between the kneading tank and the mold, the injection plate including a through hole which the kneaded material can pass through;

the piston may make the kneaded material contained in the kneading tank pass through the through hole of the injection plate and thereby inject the kneaded material into the mold; and the control unit may calculate a total reference volume of the kneaded material by calculating a sum of:

a volume of the through hole of the injection plate in which the kneaded material is contained;

a volume of the mold in which the kneaded material is contained; and a kneading tank reference inner volume for the kneaded material in the kneading tank upon the completion of the predetermined injection.

According to the above-described configuration, it is possible to calculate the total reference volume of the kneaded material by using the volume of the kneaded material contained in the injection plate and that in the mold, both of which can be calculated in advance, and the kneading tank reference inner volume. Therefore, it is possible to improve the calculation accuracy of the amount of supply of the raw material for the core.

Further, the core molding apparatus may further include a position sensor configured to detect a position of the piston; and the control unit may be further configured to:

obtain a kneading tank inner volume change amount based on a difference between a reference position of the piston upon the completion of the injection determined based on the kneading tank reference inner volume and the detected position of the piston upon the completion of the injection, the kneading tank inner volume change amount being a difference between the kneading tank reference inner volume and the kneading tank volume; and calculate the amount of the change in the total volume based on the kneading tank inner volume change amount, the volume of the through hole of the injection plate in which the kneaded material is contained, and the volume of the mold in which the kneaded material is contained.

According to the above-described configuration, it is possible to calculate the amount of the change in the total volume based on the position of the piston. Therefore, it is possible to easily calculate the amount of supply of the raw material for the core for each injection.

Another exemplary aspect is a method for molding a core including:

supplying a raw material for the core to a kneading tank;

kneading the raw material in the kneading tank;

injecting a kneaded material made of the raw material kneaded in the kneading tank into a mold by a piston, and thereby molding the core;

calculating an amount of a change in a total volume of the kneaded material in a core molding apparatus upon completion of a predetermined injection by subtracting a kneading tank volume for the kneaded material remaining in the kneading tank after the predetermined injection from a total reference volume of the kneaded material in the core molding apparatus after the predetermined injection; and determining an amount of supply of the raw material by multiplying the amount of the change in the total volume by a density of the molded core.

According to the above-described configuration, the amount of supply of a raw material is obtained by using the density of a molded core after an injection and the change in the volume of a kneaded material in the whole core molding apparatus after the injection. Therefore, the influence of the change in the density of the core after the injection from the density thereof before the injection on the calculation accuracy of the amount of supply of the material for the core is reduced. Therefore, it is possible to reduce the possibility of the deterioration in the calculation accuracy of the amount of supply of a raw material for a core.

Further, in the molding of the core, the core may be molded by making the kneaded material made of the raw material kneaded in the kneading tank pass through a through hole of an injection plate by the piston and thereby injecting the kneaded material into the mold, and the method for molding the core may further include, before the calculating of the amount of the change in the total volume of the kneaded material in the core molding apparatus after the injection, calculating a total reference volume of the kneaded material by calculating a sum of:

a volume of the through hole of the injection plate in which the kneaded material is contained;

a volume of the mold in which the kneaded material is contained; and a kneading tank reference inner volume for the kneaded material in the kneading tank upon the completion of the predetermined injection.

According to the above-described configuration, it is possible to calculate the total reference volume of the kneaded material by using the volume of the kneaded material contained in the injection plate and that in the mold, both of which can be obtained in advance, and the kneading tank reference inner volume. Therefore, it is possible to improve the calculation accuracy of the amount of supply of the raw material for the core.

Further, the calculating of the amount of the change in the total volume of the kneaded material in the core molding apparatus after the injection may further include:

obtaining a kneading tank inner volume change amount based on a difference between a reference position of the piston upon the completion of the injection determined based on the kneading tank reference inner volume and the position of the piston upon the completion of the injection, the kneading tank inner volume change amount being a difference between the kneading tank reference inner volume and the kneading tank volume; and calculating the amount of the change in the total volume based on the kneading tank inner volume change amount, the volume of the through hole of the injection plate in which the kneaded material is contained, and the volume of the mold in which the kneaded material is contained.

According to the above-described configuration, it is possible to calculate the amount of the change in the total volume based on the position of the piston. Therefore, it is possible to easily calculate the amount of supply of the raw material for the core for each injection.

According to the present disclosure, it is possible to provide a core molding apparatus and a core molding method capable of reducing the possibility of the deterioration in the calculation accuracy of the amount of supply of a raw material for a core.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the below-shown embodiments. Further, for clarifying the explanation, the following descriptions and drawings are simplified as appropriate.

First Embodiment

Figure 1:
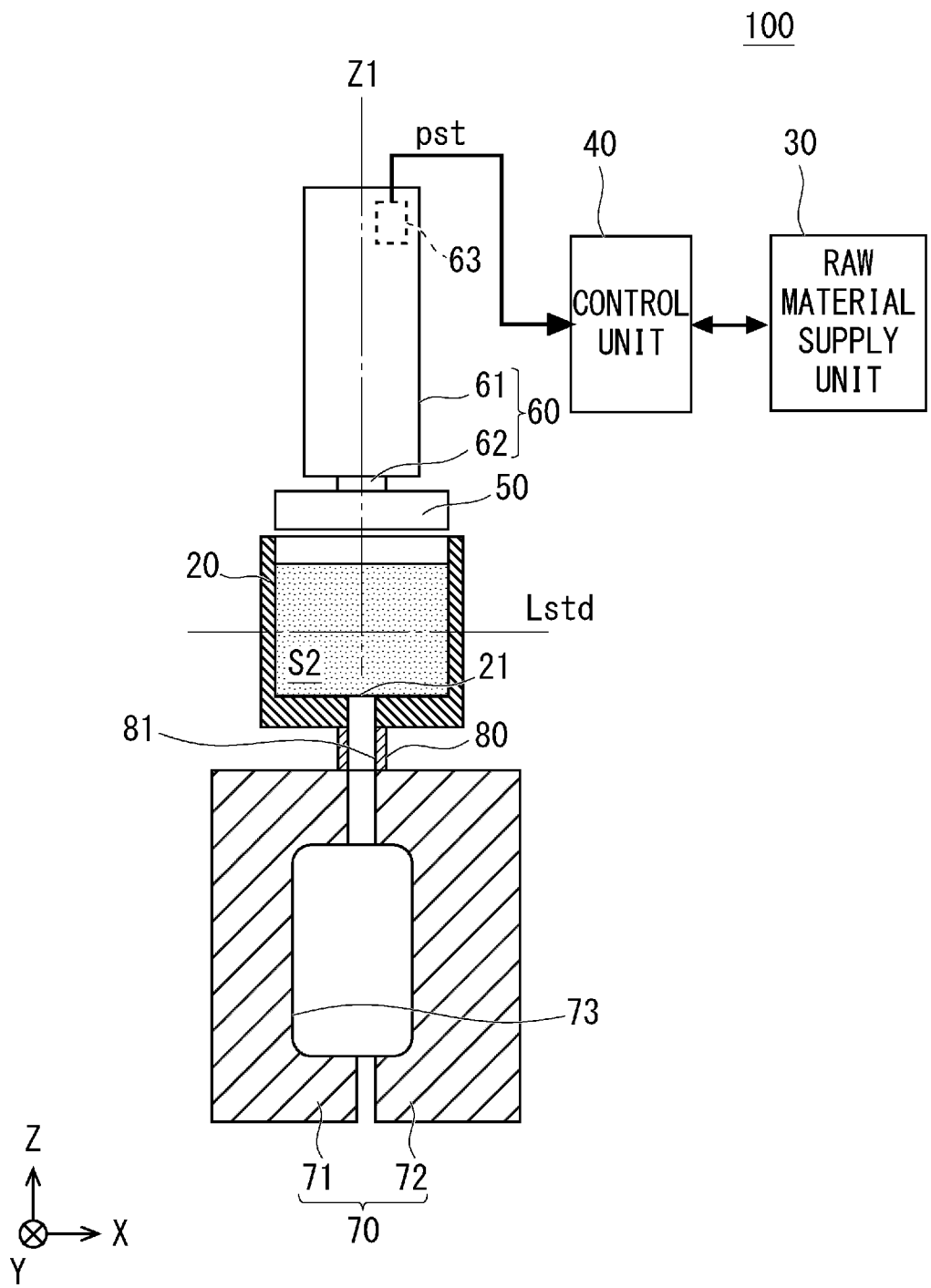
FIG. 1 is a cross-sectional view of a core molding apparatus according to a first embodiment.
Figure 2:
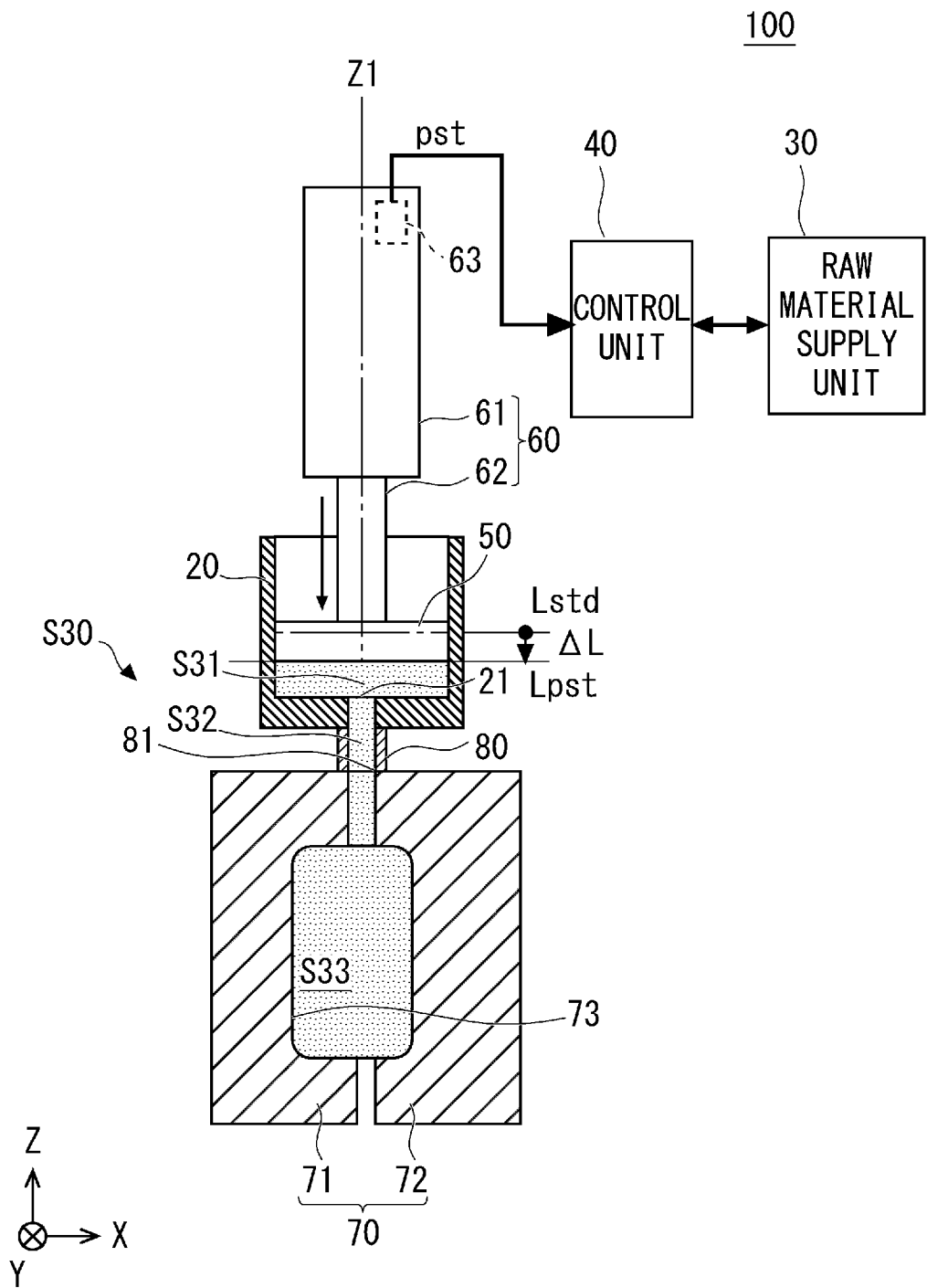
FIG. 2 is a cross-sectional view of the core molding apparatus according to the first embodiment.
Figure 3:
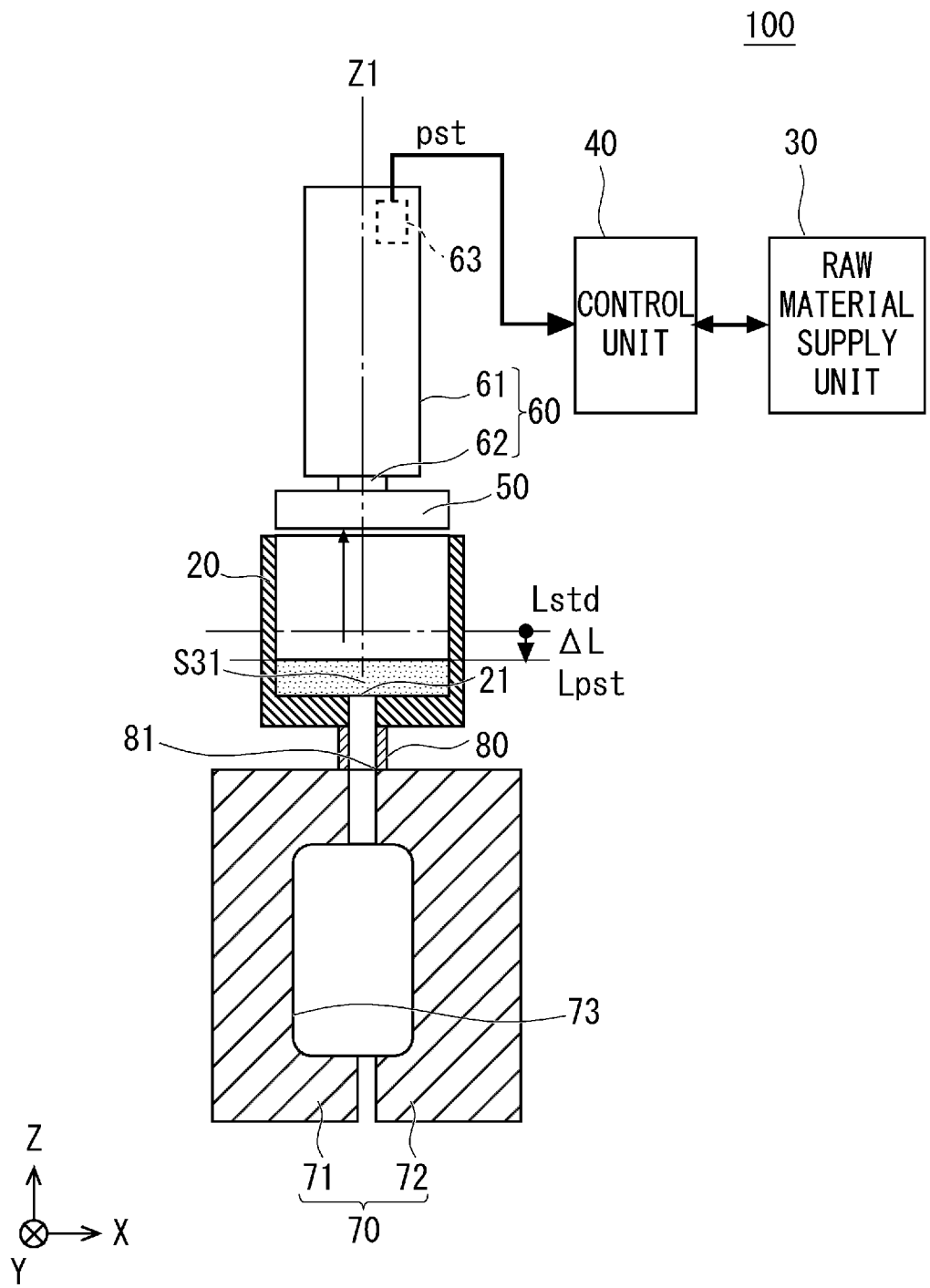
FIG. 3 is a cross-sectional view of the core molding apparatus according to the first embodiment.

A first embodiment will be described with reference to FIGS. 1 to 3. FIGS. 1 to 3 are cross-sectional views of a core molding apparatus according to the first embodiment.

Note that, needless to say, right-handed xyz-coordinate systems shown in FIG. 1 and other figures are shown only for illustrating positional relations among components. In general, a z-axis positive direction is a vertically upward direction and an xy-plane is a horizontal plane. The direction and plane are in common throughout the drawings.

As shown in FIG. 1, a core molding apparatus 100 includes a kneading tank 20, a raw material supply unit 30, a control unit 40, a piston 50, a cylinder 60, and a mold 70. The core molding apparatus 100 according to this embodiment further includes an injection plate 80.

The kneading tank 20 is a cylindrical member with a bottom, in which the top is opened. The cross sectional area $A_T$ of the kneading tank, which is the cross sectional area of the internal space of the cylindrical member, is preferably constant along the axial direction. A through hole 21 is formed in the bottom of the kneading tank 20. As shown in FIG. 1, a kneaded material S2 is supplied to (i.e., contained in) the kneading tank 20. For example, the kneaded material S2 can be obtained by kneading (e.g., mixing and kneading)

sand, water, water glass, and/or a liquid additive(s) such as a surfactant. Specific examples of the sand include Espearl (manufactured by Yamakawa Sangyo Co., Ltd.), Lunamos (manufactured by Kao-Quaker Co., Ltd.), Green Beads (manufactured by Kinsei Matek Co., Ltd.), and AC Alumina Sand (manufactured by Hisagoya Co., Ltd.). Note that the water glass serves as a binder. The binder is not limited to water glass, and any other appropriate compound can be selected as desired.

The raw material supply unit 30 supplies the kneaded material S2 to the kneading tank 20. Specifically, firstly, the raw material supply unit 30 supplies sand, water, water glass, and/or a liquid additive(s) such as a surfactant to the kneading tank 20. More specifically, the raw material supply unit 30 supplies sand having a predetermined mass to the kneading tank 20. Further, it is preferred that the raw material supply unit 30 can change the mass of the sand supplied to the kneading tank 20 each time a core is molded. The raw material supply unit 30 kneads (e.g., mixes and kneads) sand, water, water glass, and/or a liquid additive(s) such as a surfactant in the kneading tank 20, and supplies the kneaded material S2 to the kneading tank 20.

As shown in FIGS. 2 and 3, the piston 50 can be moved vertically (in the Z-axis direction) by the cylinder 60. Note that the forward movement of the piston 50 means that the piston 50 moves vertically downward (toward the negative side in the Z-axis direction), and the backward movement of the piston 50 means that the piston 50 moves vertically upward (toward the positive side in the Z-axis direction). As shown in FIG. 2, as the piston 50 moves forward, the kneaded material S2 contained in the kneading tank 20 is injected into the mold 70.

The mold 70 contains the kneaded material S2 injected by the piston 50 and molds a core therefrom. The mold 70 includes a first mold 71 and a second mold 72, which are opened and closed. As shown in FIG. 1, as the first and second molds 71 and 72 are closed, an internal space 73 is formed therebetween. The internal space 73 includes a cavity, a runner, and the like. The cavity has substantially the same shape as that of the above-described molded core. A volume Vn of the mold 70 in which the kneaded material S2 is contained is substantially equal to the volume of the internal space 73. When the first and second molds 71 and 72 are opened, a space corresponding to the internal space 73 is exposed to the outside.

The injection plate 80 according to this embodiment is disposed between the kneading tank 20 and the mold 70. The injection plate 80 includes a through hole 81 which the kneaded material S2 can pass through. The through hole 21 of the kneading tank 20, the through hole 81 of the injection plate 80, and the internal space 73 of the mold 70 are continuous from one to another. The kneaded material S2 contained inside the kneading tank 20 passes through the through hole 21 and the through hole 81, and reaches (i.e., enters) the internal space 73 of the mold 70. The kneaded material S2 is contained in the through hole 81 and in the internal space 73. The through hole 81 can contain the kneaded material S2 having a predetermined volume Vp.

The cylinder 60 includes a cylinder body 61 and a cylinder rod 62. The piston 50 is attached to the tip of the cylinder rod 62.

Further, a position sensor 63, e.g., a linear encoder, is provided inside the cylinder 60. Therefore, a position signal pst indicating the position of the piston 50 is output from the cylinder 60 to the control unit 40. Since the position sensor 63 is disposed inside the cylinder 60, its durability is better that when the position sensor is disposed outside the cylinder. However, the position sensor 63 does no need to be disposed inside the cylinder 60.

The control unit 40 includes an arithmetic unit and a memory. The memory stores a predetermined program(s). The arithmetic unit loads the program stored in the memory and executes the loaded program. The control unit 40 has a hardware configuration including, as the main component, a computer including a CPU (Central Processing Unit), a ROM, a RAM, an interface (I/F), and the like. The CPU, the ROM, the RAM, and the interface are connected to each other through a data bus and the like.

The control unit 40 calculate a total volume change amount $\Delta V$ (i.e., the amount $\Delta V$ of a change in the total volume) of the kneaded material S2 in the core molding apparatus 100 upon completion of a predetermined injection by subtracting a kneading tank volume $V_T$ for the kneaded material S31 remaining in the kneading tank 20 after the predetermined injection from a total reference volume $V_{Mstd}$ of the kneaded material S2 in the core molding apparatus 100 after the predetermined injection. Note that the kneaded material S2 in the core molding apparatus 100 after the injection corresponds to a molded article S30 (which will be described later). A relational expression (1) between the kneading tank volume $V_T$ and the total volume change amount $\Delta V$ is shown below.

$$\Delta V = V_{Mstd} - V_T \quad (1)$$

Further, the control unit 40 determines an amount $M_{S1}$ of supply (hereinafter also referred to as a supply amount $M_{S1}$) of the raw material by multiplying the total volume change amount $\Delta V$ by the density $\rho_n$ of the molded core. The density $\rho_n$ of the core can be determined by measuring it in advance by experiments or the like. A relational expression (2) among the supply amount $M_{S1}$ of the raw material, the total volume change amount $\Delta V$, and the density $\rho_n$ of the molded core is shown below.

$$M_{S1} = \Delta V \times \rho_n \quad (2)$$

The control unit 40 may calculate the total reference volume $V_{Mstd}$ of the kneaded material S2 by obtaining the sum of a volume Vp of the through hole 81 of the injection plate 80 in which the kneaded material S2 is contained, a volume Vn of the mold 70 in which the kneaded material S2 is contained, and a kneading tank reference inner volume $V_{Tstd}$ of the kneaded material S2 in the kneading tank 20 upon the completion of the predetermined injection. A relational expression (3) among the total reference volume $V_{Mstd}$, the volume Vp in the through hole 81, the volume Vn of the mold 70 in which the kneaded material S2 is contained, and the kneading tank reference inner volume $V_{Tstd}$ is shown below.

$$V_{Mstd} = Vp + Vn + V_{Tstd} \quad (3)$$

Further, the control unit 40 may obtain a kneading tank inner volume change amount $\Delta V_T$, which is a difference between the kneading tank reference inner volume $V_{Tstd}$ and the kneading tank volume $V_T$, based on a difference $\Delta L$ between a reference position Lstd of the piston 50 upon the completion of the injection determined based on the kneading tank reference inner volume $V_{Tstd}$ and a detected position Lpst of the piston 50 upon the completion of the injection. A relational expression (4) between the reference position Lstd, the position Lpst of the piston 50 upon the completion of the injection, the kneading tank inner volume change amount $\Delta V_T$, and the kneading tank cross sectional area $A_T$ is shown below.

$$\Delta V_T = (Lpst - Lstd) \times A_T \quad (4)$$

Here, a relational expression (5) among the kneading tank inner volume change amount $\Delta V_T$, the kneading tank volume $V_T$, and the kneading tank reference inner volume $V_{Tstd}$ is shown below.

$$\Delta V_T = V_T - V_{Tstd} \quad (5)$$

Further, the control unit 40 may calculate the total volume change amount $\Delta V$ based on the kneading tank inner volume change amount $\Delta V_T$, the volume Vp of the through hole 81 of the injection plate 80 in which the kneaded material S2 is contained, and the volume Vn of the mold 70 in which the kneaded material S2 is contained. Note that the volume Vp is equal to the volume of a molded article S32 (which will be described later). Further, the volume Vn is equal to the volume of a molded article S33 (which will be described later).

Based on the above-shown expressions (1) to (5), it is possible to derive an expression (6) by which the supply amount $M_{S1}$ of the raw material can be calculated.

$$\begin{aligned} M_{S1} &= \Delta V \times \rho_n \quad (6) \\ &= (V_{Mstd} - V_T) \times \rho_n \\ &= (Vp + Vn - (V_T - V_{Tstd})) \times \rho_n \\ &= (Vp + Vn - \Delta V_T) \times \rho_n \\ &= [Vp + Vn - (Lpst - Lstd) \times A_T] \times \rho_n \end{aligned}$$

The reference position Lstd of the piston 50 upon the completion of the injection is based on the kneading tank reference inner volume $V_{Tstd}$ of the kneaded material S2 in the kneading tank 20 upon the completion of the predetermined injection. The kneading tank reference inner volume $V_{Tstd}$ is preferably constant. Specifically, it is preferred that the kneading tank reference inner volume $V_{Tstd}$ does not fluctuate each time the piston 50 injects the kneaded material S2. The kneading tank reference inner volume $V_{Tstd}$ can be obtained, for example, by experiments. Specifically, for example, the kneading tank reference inner volume $V_{Tstd}$ is set to a certain value, and when a core is actually molded, the position of the piston 50 upon the completion of the injection is measured. Then, the value of the kneading tank reference inner volume $V_{Tstd}$ is corrected based on the deviation (i.e., the difference) of the position of the piston 50 upon completion of a target injection (i.e., upon completion of an injection of a target amount of a kneaded material). It is possible to determine the kneading tank reference inner volume $V_{Tstd}$ by performing the above-described series of processes at least once. It is possible to determine the reference position Lstd of the piston 50 upon completion of an injection by determining the kneading tank reference inner volume $V_{Tstd}$.

Note that the supply amount $M_{S1}$ of the raw material may be adjusted as appropriate with consideration given to the supply amount of a binder, the supply amount of a surfactant, and the supply amount of water.

(Core Molding Method)

Figure 4:
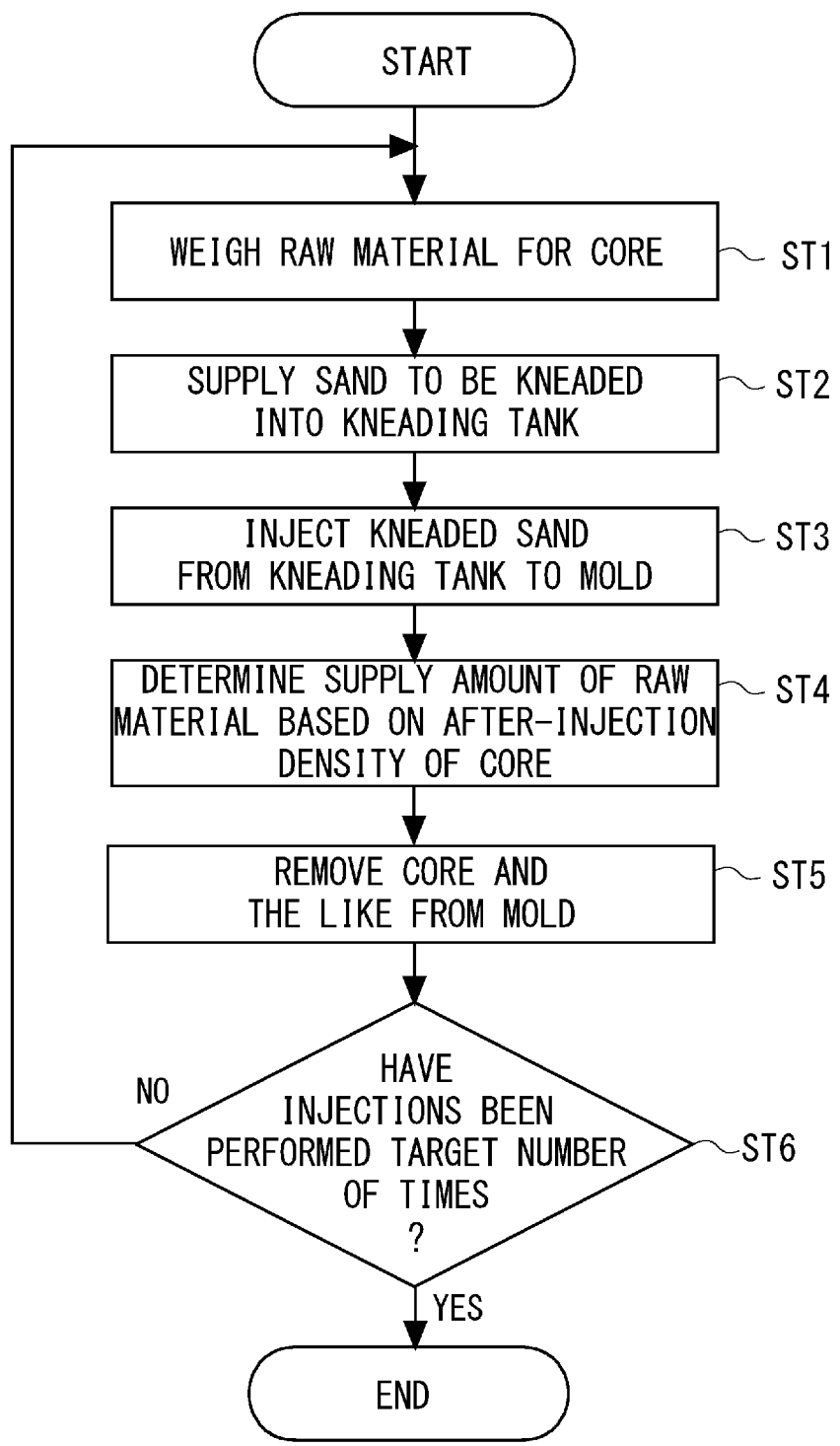
FIG. 4 is a flowchart showing a method for molding a core according to the first embodiment.

Next, a method for molding a core according to the first embodiment will be described with reference to FIG. 4. FIG. 4 is a flowchart showing the method for molding a core according to the first embodiment. When FIG. 4 is referred to, FIGS. 1 to 3 may also be referred to as appropriate.

A raw material for a core is weighed to obtain a predetermined mass thereof from the raw material supply unit 30 (Step ST1). The mass of the raw material to be supplied for the first time is larger than the mass of the core to be molded, and is, for example, about twice to several times thereof.

Next, a kneaded material S2 is prepared by using the above-described weighed raw material and is supplied to the kneading tank 20 (Step ST2). Specifically, the kneaded material S2 is prepared by kneading (e.g., mixing and kneading) the raw material in the kneading tank 20 by using a kneading blade(s) or the like.

Next, as shown in FIGS. 1 and 2, the kneaded material S2 contained in the kneading tank 20 is injected into the mold 70 by the piston 50, and a molded article S30 is thereby molded (Step ST3). Note that the step ST3 is preferably performed after the kneading tank 20 is transferred (i.e., moved) onto the mold 70. The molded article S30 includes a kneaded material S31, a molded article S32, and a molded article S33. The kneaded material S31 remains in the kneading tank 20. The molded article S32 remains in the through hole 81 of the injection plate 80. The molded article S33 remains in the internal space 73 of the mold 70.

Next, the control unit 40 calculates the total volume change amount $\Delta V$ of the molded article S30 after the injection, and determines the supply amount $M_{S1}$ of the raw material by multiplying this calculated total volume change amount $\Delta V$ by the density $\rho_n$ of the molded core (Step ST4).

Next, as shown in FIG. 3, after the injection, the molded articles S32 and S33 are removed from the mold 70 (Step ST5). Specifically, after the injection, the first and second molds 71 and 72 are opened, and the molded articles S32 and S33 are removed the mold 70. After the injection, the kneaded material S31 remains in the kneading tank 20. Further, the core can be obtained by trimming unnecessary parts from the molded article S33.

Next, when injections have not been performed a target number of times (Step ST6: No), the process returns to the step ST1, and the raw material is weighed to obtain the predetermined mass thereof determined in the step ST4. On the other hand, when injections have been performed the target number of times (Step ST6: Yes), the continuous molding of cores is finished.

As described above, according to the above-described method for molding a core, the supply amount $M_{S1}$ of the raw material is obtained by using the density $\rho_n$ of the molded core after the injection and the total volume change amount $\Delta V$ of the kneaded material S2 in the whole core molding apparatus 100 after the injection. Therefore, the change in the density of the core after the injection from the density thereof before the injection does not affect the calculation accuracy of the supply amount $M_{S1}$ of the raw material for the core. Therefore, it is possible to reduce the possibility of the deterioration in the calculation accuracy of the supply amount $M_{S1}$ of the raw material for the core.

Further, according to the above-described method for molding a core, it is possible to calculate the total reference volume $V_{Mstd}$ of the kneaded material by using the volumes Vp and Vn of the kneaded material S2 contained in the injection plate 80 and in the mold 70, both of which can be obtained in advance, and the kneading tank reference inner volume $V_{Tstd}$. Therefore, it is possible to improve the calculation accuracy of the supply amount $M_{S1}$ of the raw material for the core.

Further, according to the above-described method for molding a core, it is possible to calculate the total volume change amount $\Delta V$ based on the position Lpst of the piston. Therefore, it is possible to easily calculate the supply amount $M_{S1}$ of the raw material for the core for each injection.

Specific Example

Figure 5:
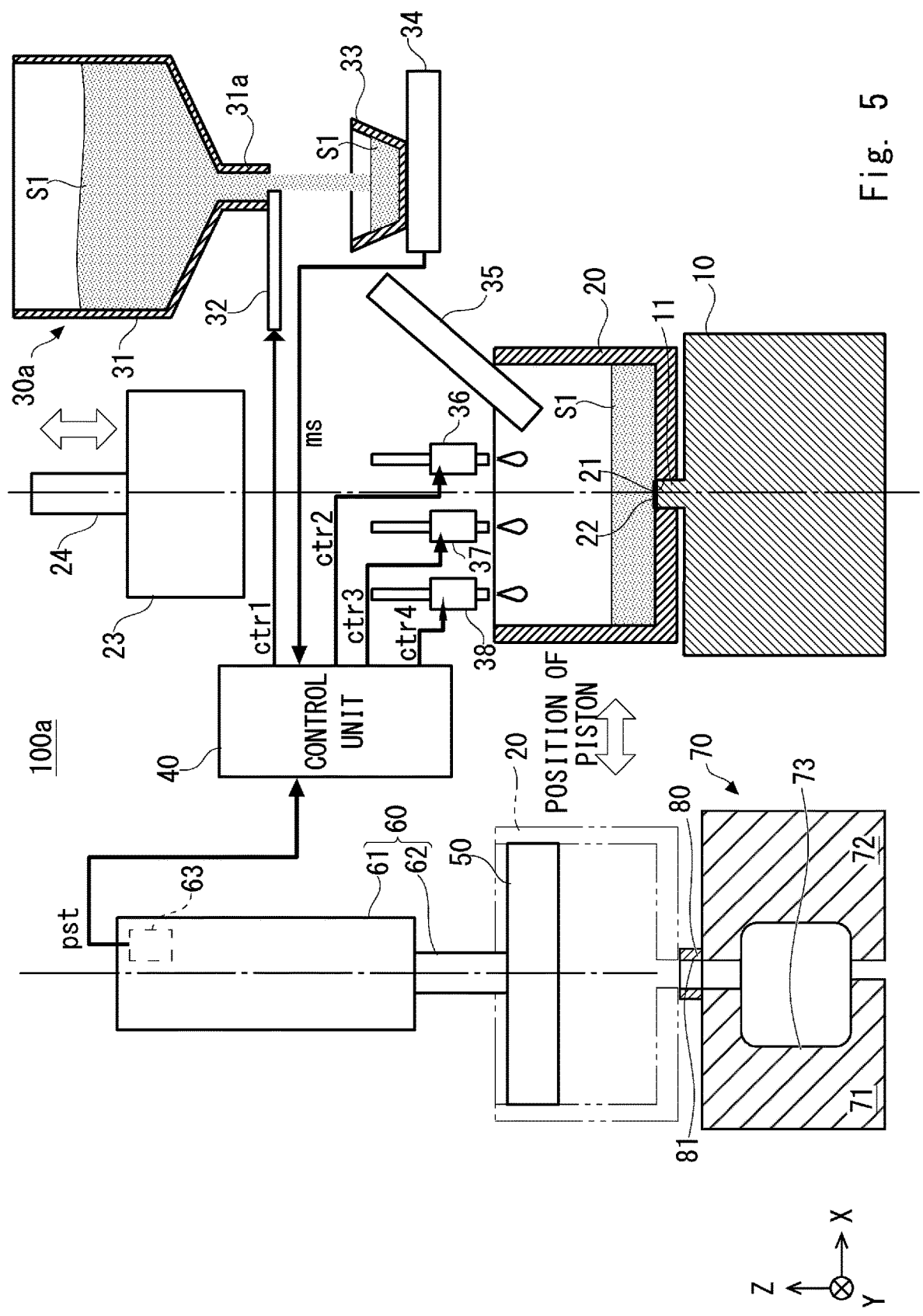
FIG. 5 is a cross-sectional diagram of a specific example of the core molding apparatus according to the first embodiment.

A specific example of the core molding apparatus according to the first embodiment will be described with reference to FIG. 5. FIG. 5 is a cross-sectional diagram of a specific example of the core molding apparatus shown in FIGS. 1 to 3.

As shown in FIG. 5, a core molding apparatus 100a includes a valve 22, a kneading blade(s) 23, and a rotation rod 24 in addition to the components/structures of the core molding apparatus 100 shown in FIG. 1. The core molding apparatus 100a includes a raw material supply unit 30a, which is a specific example of the raw material supply unit 30 shown in FIG. 1.

Sand S1, water, water glass, and/or a liquid additive(s) such as a surfactant, which are raw materials for a core, are supplied to the kneading tank 20 through the opened top thereof.

For example, the valve 22 made of rubber or the like is attached to the through hole 21. The valve 22 can prevent the raw material such as the sand S1 supplied to the kneading tank 20 and the kneaded material S2 from leaking from the kneading tank 20. Meanwhile, in the central part of the valve 22, for example, cutting having a + (plus) shape (i.e., an X-shape) in a plan view and extending through the valve (i.e., extending from the top surface to the bottom surface of the valve) in the vertical direction (the Z-axis direction) is formed. Therefore, as shown in FIGS. 1 and 2, when a pressure is applied to the kneaded material S2 contained in the kneading tank 20 and hence the kneaded material S2 is injected, the cutting in the valve 22 can be opened.

As shown in FIG. 5, the kneading tank 20 is placed, for example, on a pedestal 10 having a horizontal top surface. A projection 11, which is engaged with the through hole 21 formed in the bottom of the kneading tank 20, is formed on the top surface of the pedestal 10. That is, the projection 11 of the pedestal 10 is engaged with (i.e., inserted into) the through hole 21 of the kneading tank 20, and it supports the valve 22 attached to the through hole 21 from below. By the above-described configuration, it is possible to prevent the kneaded material S2 from leaking from the kneading tank 20 even when the kneaded material S2 is being kneaded.

The kneaded material S2 is obtained by kneading the raw material such as the sand S1 supplied to the kneading tank 20 by the kneading blade 23. The kneading blade 23 includes one or a plurality of plate-like members fixed to the rotation rod 24 extending in the vertical direction (the Z-axis direction). The directions of the normal to the plate-like members constituting the kneading blade 23 are all perpendicular to the Z-axis direction. The rotation rod 24 is connected to a driving source such as a motor (not shown), and the kneading blade 23 rotates by using the rotation rod 24 as the rotation shaft. Note that it is preferred that the central axis of the rotation rod 24 coincides with the central axis of the kneading tank 20.

Further, the kneading blade 23 can move in the vertical direction (the Z-axis direction) together with the rotation rod 24. FIG. 5 schematically shows a state in which the kneading blade 23 is retracted upward (toward the positive side in the Z-axis) and is not rotating. The kneading blade 23 can be lowered (moved toward the negative side in the Z-axis) and can be rotated while being inserted in the kneading tank 20.

The raw material supply unit 30 includes a hopper 31, a shutter 32, a weighing dish 33, a weighing meter 34, a sand charging chute 35, and pumps 36 to 38.

In the hopper 31, the sand S1 to be supplied to the kneading tank 20 is stored. An openable/closable shutter 32 is attached to a discharge port 31a of the hopper 31, so that the amount of the sand S1 charged (i.e., supplied) from the discharge port 31a to the weighing dish 33 can be adjusted. The opening/closing and the degree of opening of the shutter 32 are controlled by a control signal ctr1 output from the control unit 40.

The weighing dish 33 is placed on the weighing meter 34, and the mass of the sand S1 charged (i.e., supplied) onto the weighing dish 33 is measured. For example, a load cell is provided inside the weighing meter 34, and a mass signal ms representing the mass measured by the weighing meter 34, which is an electric signal, is output to the control unit 40. That is, the control unit 40 generates the control signal ctr1 based on the mass signal ms, and thereby performs feedback control for the opening/closing and the degree of opening of the shutter 32.

Specifically, the control unit 40 performs control, for example, as follows. When the charging of the sand S1 onto the weighing dish 33 is started, the control unit 40 outputs a control signal ctr1 for opening the shutter 32 to its full width. After that, when the mass signal ms output from the weighing meter 34 gets close to a supply amount determined in advance by the control unit 40, the control unit 40 outputs a control signal ctr1 for reducing the degree of opening of the shutter 32. Then, when the mass signal ms output from the weighing meter 34 reaches the supply amount determined in advance by the control unit 40, the control unit 40 outputs a control signal ctr1 for closing the shutter 32.

When the mass of the sand S1 charged onto the weighing dish 33 reaches the supply amount determined in advance by the control unit 40, for example, the weighing dish 33 is rotated around the Y-axis (i.e., is tilted), so that the sand S1 on the weighing dish 33 is supplied to the kneading tank 20 through the sand charging chute 35.

The pumps 36 to 38 are diaphragm pumps for supplying water, water glass, and a surfactant, respectively, to the kneading tank 20. The amount of water supplied from the pump 36 is controlled by a control signal ctr2 output from the control unit 40. Similarly, the amount of water glass supplied from the pump 37 is controlled by a control signal ctr3 output from the control unit 40. Similarly, the amount of the surfactant supplied from the pump 38 is controlled by a control signal ctr4 output from the control unit 40. For example, the control signals ctr2 to ctr4 are pulse signals, and amounts of the water, the water glass, and the surfactant, which are determined according to the numbers of pulses of the pulse signals, are supplied from the pumps 36 to 38, which are diaphragm pumps.

After the raw material such as the sand S1 is kneaded (e.g., mixed and kneaded) in the kneading tank 20 placed on the pedestal 10, the kneading tank 20 containing the kneaded material S2 is transferred (i.e., moved) from the pedestal 10 onto the mold 70. In FIG. 5, the kneading tank 20 on the mold 70 is indicated by two-dot chain lines.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described embodiments, and they may be modified as appropriate without departing from the spirit and scope of the disclosure. Further, the present disclosure may be carried out by combining the above-described embodiments and the example thereof as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for molding a core comprising:

supplying a raw material that includes sand, water, water glass, and/or a liquid additive for the core to a kneading tank;

kneading the raw material in the kneading tank;

injecting a kneaded material made of the raw material kneaded in the kneading tank into a mold by a piston by making the kneaded material made of the raw material kneaded in the kneading tank pass through a through hole of an injection plate by the piston, and thereby molding the core by forming a molded article with a first portion of the kneaded material remaining in the kneading tank, a second portion of the kneaded material remaining in the through hole of the injection plate, and a third portion of the kneaded material remaining in an internal space of the mold;

calculating an amount of a change in a total volume of the kneaded material in the kneading tank upon completion of the injection by $\Delta V = V_p + V_n - (L_{pst} - L_{std}) \times A_T$, in which $\Delta V$ is the amount of the change in the total volume of the kneaded material in the kneading tank upon completion of the injection, $V_p$ is a volume of the through hole of the injection plate, $V_n$ is a volume of the mold in which the kneaded material is contained, $L_{pst}$ is a detected position of the piston upon completion of the injection, $L_{std}$ is a predetermined reference position of the piston upon completion of the injection based on a reference inner volume of the kneading tank, and $A_T$ is a cross-sectional area of the kneading tank;

determining an amount of supply of the raw material by multiplying the amount of the change in the total volume by a density of a molded core measured in advance;

opening the mold and removing the second portion of the molded article and the third portion of the molded article; and supplying the determined amount of supply of the raw material to the kneading tank with the first portion of the molded article in the kneading tank, wherein the density of the molded core measured in advance and that of the kneaded material before the injection are different.

* * * * *